Sept. 8, 1959 W. D. HOWELL 2,903,524
D-C AMPLIFIER
Filed Jan. 31, 1956
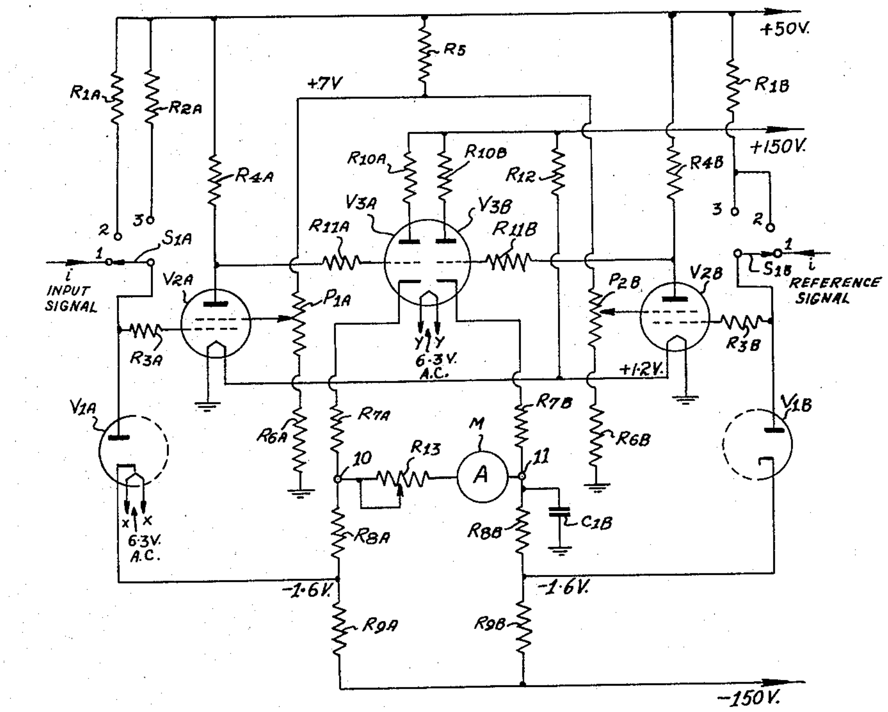
INVENTOR
WILLIAM D. HOWELL
By- Smart + Biggar
ATTORNEYS United States Patent Office 2,903,524

Patented Sept. 8, 1959

2,903,524

D-C AMPLIFIER

William D. Howell, Deep River, Ontario, Canada, assignor to Atomic Energy of Canada Limited, Ottawa, Ontario, Canada Application January 31, 1956, Serial No. 562,574

4 Claims. (Cl. 179—171)

The invention relates to D.-C. (direct-coupled) amplifiers of the type useful in measuring very small currents, for example, in the order of 100 microamperes and less.

Various forms of D.-C. amplifiers have been available but there has been a need for one capable of measuring a wide range of current intensities while not suffering from inaccuracies due to variations of filament voltage, ageing of the tubes, etc.

The present invention provides a D.-C. amplifier giving a logarithmic response for measurements over a wide range of intensities while reducing the inaccuracies formerly present in such measurements.

A D.-C. amplifier according to the invention comprises a first and a second feedback amplifier; each feedback amplifier having at least two direct-coupled electron-tube amplifier stages; a feedback path from a cathode circuit of the last stage to the control grid circuit of the first stage, an input signal connection to the control grid circuit of each amplifier stage, a diode rectifier connected in the feedback path to conduct current from the grid circuit to the cathode circuit so that the input signal current to the grid circuit is conducted by the rectifier; and an output signal connection from the cathode circuit of the first feedback amplifier to the cathode circuit of the second feedback amplifier. Preferably the diode rectifiers connected in the feedback path of each of the feedback amplifiers is an electron tube type rectifier, the two diode rectifiers being contained in a common envelope.

In a circuit in accordance with the invention the input signal is conducted by a diode rectifier connected to the control grid circuit. For small currents (approximately 100 microamperes and less) the relationship between the plate current and plate voltage of the diode obeys the known relationship—

$$\log_{10} i_p \frac{e_p}{0.21} + \log_{10} i_0$$

where $i_p$=plate current
$e_p$=voltage (see text book "Radiation Laboratory Series No. 19," page 61, et seq., published by McGraw-Hill)

According to this relationship a tenfold increase in current produces a 0.21 increment in voltage. The figure 0.21 voltage per decade is a function of tube geometries and of tube filament voltage, so it may assume different values for different tubes. However it is quite constant for a given tube type operating at a given filament voltage.

According to the invention the input signal current is translated into logarithmic increments of voltage at the input circuit of one feedback amplifier and these increments of voltage are then amplified. By having a second similar feedback amplifier and obtaining the output signal between the cathode circuits of the two feedback amplifiers, while the input signal to the second feedback amplifier is held constant, compensation is provided for zero drifts caused by ageing of the tubes or variations in filament voltages. If desired the input signal to the second amplifier may be controlled to provide compensation for some undesired variation at the source of the input signal.

The invention will be further described with reference to the accompanying drawing showing a schematic circuit diagram of a D.-C. amplifier in accordance with the invention.

The D.-C. amplifier shown in the drawing comprises a first feedback amplifier having tubes $V_{1A}$, $V_{2A}$ and $V_{3A}$ and a second feedback amplifier having tubes $V_{1B}$, $V_{2B}$ and $V_{3B}$. In the drawing the various components of the first feedback amplifier are indicated by "A" in their designations, while the various components of the second feedback amplifier are indicated by a "B." The tubes $V_{1A}$ and $V_{1B}$ together form a double diode type of electron tube having a common envelope and the tubes $V_{3A}$ and $V_{3B}$ form the halves of a double triode tube. The circuits of the two feedback amplifiers are similar and in most cases the components of one are duplicated in the other. The following is a list of the components used in the circuit giving typical design values:

| Component: | Value |
|---|---|
| Resistor $R_1$ | depends on current range of input signal *i*. |
| Resistor $R_2$ | 10 times value of $R_1$. |
| Resistor $R_3$ | 10,000 ohms. |
| Resistor $R_4$ | 7,500,000 ohms. |
| Resistor $R_5$ | 22,000 ohms. |
| Resistor $R_6$ | 2,200 ohms. |
| Resistor $R_7$ | 2,500 ohms. |
| Resistor $R_8$ | 400 ohms. |
| Resistor $R_9$ | 40,000 ohms. |
| Resistor $R_{10}$ | 1,000 ohms. |
| Resistor $R_{11}$ | 10,000 ohms. |
| Resistor $R_{12}$ | 7,500 ohms. |
| Resistor $R_{13}$ | as required to adjust meter scale. |
| Condenser $C_1$ | 4 microfarads. |
| Tubes $V_1$ | double diode type 6AL5. |
| Tubes $V_2$ | electrometer tube type 5886. |
| Tubes $V_3$ | double triode type 2C51. |
| Meter M | direct current 0–50 microamperes. |

The operation of the amplifier shown in the schematic diagram will now be described, referring first to the feedback amplifier shown at the left-hand side of the circuit of which the components are designated by an "A." It is assumed that an input signal current *i* flows into the diode rectifier $V_{1A}$ by way of the switch $S_{1A}$ in its No. 1 position. With zero signal current in the diode $V_{1A}$ the potentiometer $P_{1A}$ can be adjusted until the point 10 is at zero volts with respect to ground. A tenfold reduction of the input signal current *i* will then cause the voltage from the point 10 to ground to increase to a reading of approximately +0.21 volt. This follows from the relationship discussed above in the opening paragraphs of this specification. Also a tenfold increase in the input signal current *i* will cause the voltage at 10 with respect to ground to decrease to —0.21 volt. A hundred-fold increase or decrease of the input signal current *i* will give corresponding readings of —0.42 volt and +0.42 volt.

The feedback amplifier at the left-hand side of the drawing by itself would be subject to zero drifts arising from a number of factors some of which have quite serious effects. A 10% variation of filament voltage of $V_{1A}$ would cause a 0.1 volt shift in zero of the output indicator and this amounts to 50% of the change in output indication resulting from a decade variation in input signal current. A similar effect is produced with ageing and change in contact potential of the diode rectifier. Other factors affecting the zero stability are heater-contact potential variations in the tubes $V_{2A}$ and $V_{3A}$. In the case of $V_{2A}$ it is found in practice that providing the filament is fed from a stabilized source (for example by a bleed of 20 milliamperes from a conventional series stabilized power supply) long term drifts due to contact potential variation are of the order of 0.001 volt, that is, less than one-half percent of the output voltage variation for a decade change in the input signal current. Because of the high gain of the feedback loop, heater-contact potential variation in $V_{3A}$ scarcely affects the zero stability provided these variations are within reasonable limits. Accordingly in the circuit of the feedback amplifier shown at the left-hand side of the drawing, the main factors involving zero stability are drift due to heater or contact potential variations in the diode rectifier $V_{1A}$. According to the invention, this is compensated for by a second feedback amplifier such as that shown at the right-hand side of the drawing and of which the components are designated by a "B."

The output rectifiers $V_{1A}$ and $V_{1B}$ are the two halves of a double diode rectifier having a common envelope and, with equal current into the two diode rectifiers, the output voltage between the points 10 and 11 can be adjusted to zero volts by adjustment of the potentiometers $P_{1A}$ and $P_{2B}$. The method used to make the adjustment is first to adjust the voltage from each of the points 10 and 11 to ground, to zero by means of the potentiometers $P_{1A}$ and $P_{2A}$, and then to connect an output meter M as shown in the drawing between the points 10 and 11. A series resistance $R_{13}$ is provided with the meter M to adjust the meter scale. It is assumed as it is found to be the case in practice that ageing or contact potential changes affect both halves $V_{1A}$ and $V_{1B}$ of the double type rectifier equally producing equal voltage shifts at the points 10 and 11 so that an overall effect is to produce no change in the voltage across the output meter M. Similarly, a filament voltage change produces a negligible zero shift in the output meter M. For example, a 20% change in the filament voltage of the diodes $V_{1A}$ and $V_{1B}$ causes a negligible change in the zero setting of the meter M even though the variation in the voltage from either the point 10 or the point 11 to ground is approximately 0.2 volt, which is substantially equal to the output voltage change caused by a decade variation in the input signal current *i*. However, variations in filament voltage of the diode rectifiers $V_{1A}$ and $V_{1B}$ produces a variation in the increment of voltage produced as a result of a decade change in input signal current *i*, so that there is a variation in the series logarithm slope (a 5% change in filament voltage produces a 2% change in slope) making it necessary in order to obtain highest accuracy to stabilize the voltage supplied to the filament of the diode rectifiers $V_{1A}$ and $V_{1B}$. Accordingly the main purpose of using a compensating diode is to correct for ageing and contact potential variations. However, it is to be noted that the degree of filament stabilization required is not nearly as great as that required for an uncompensated diode assuming no ageing of contact potential variations. This will be appreciated from the fact that in the case of the compensated diode in accordance with the invention a 5% filament variation will produce no zero shift and only a 2% variation in slope (that is 2% error at full scale) while in the case of an uncompensated diode rectifier besides the slope variation there will be approximately a 25% of a decade (0.05 volt) zero shift giving a maximum of 27% error in reading. Having set up the zero conditions and holding the reference current constant variations in the signal current will then produce voltage variations in the output at the meter M in the manner previously described. That is, a ten-fold increase or decrease in signal current will produce a variation of −0.21 volt or +0.21 volt between the points 10 and 11.

In normal operation both the switches $S_{1A}$ and $S_{1B}$ are set to their No. 1 positions and input signal current is supplied to $S_{1A}$ while the reference signal current is supplied to the switch $S_{1B}$. The reference signal current may be obtained from a positive stabilized voltage through a suitable resistance, or it may be a current used to compensate for some undesired variation at the source of the input signal current. For example, if the amplifier is being used in connection with a photometer the reference signal can be made proportional to light intensity, where the same light source is used to transmit light through a medium of a photosensitive device which provides the input signal current to the left-hand side of the circuit. In this way variations in light intensity of the lamp can be compensated for.

Positions 2 and 3 of the switches $S_{1A}$ and $S_{1B}$ are used for setting up and calibrating purposes. Suppose, for example, it is desired to cover a current range of $10^{-10}$ amperes to $10^{-6}$ amperes (that is 4 decades) then the value of the resistance $R_{1A}$ could be 50 volts/$10^{-6}$ amperes which equals 50 megohms. With each of the switches $S_{1A}$ and $S_{1B}$ set to its No. 2 position the current through the meter M can be adjusted to zero as described above. With each of the switches $S_{1A}$ and $S_{1B}$ set to its No. 3 position the current in the diode rectifier $V_{1A}$ is 1/10 of that in the diode rectifier $V_{1B}$ and the voltage at the point 10 goes positive to approximately 0.21 volt and the meter M records a decade change. In this example this would be one-quarter full scale deflection. The resistor $R_{13}$ can be used to adjust the meter sensitivity to give the required reading. If, for example, a 50 microampere meter is used, then for a 4 decade range the resistor $R_{13}$ would be a fixed resistor of 15,000 ohms plus a 5,000 ohm variable resistor. Alternatively, the meter may be replaced by a 10 millivolt recorder and the same values of $R_{13}$ can be used. Another alternative is to use a centre zero meter, for example, 25–0–25 microamperes in which case $R_{1A}$ would be 5,000 megohms, so as to set the current at $10^{-8}$ ampere midway in the desired range. For some applications this may be desirable since small errors due to change of slope are confined to both ends of the meter scale rather than to the lower end which would be the case with the 0–50 microampere meter arrangement. In the latter case, however, $R_{1A}$ could be chosen at 500,000 megohms, that is, the current would be set at $10^{-10}$ ampere, the resistor $R_{2A}$ would have 1/10 the value of the resistor $R_{1A}$ and, with the meter connections reversed, the same results would be achieved with the error due to change in slope confined to the upper range of the scale.

What I claim as my invention is:

1. A D.-C. differential amplifier comprising, a first and a second amplifier, each amplifier having at least two direct-coupled electron-tube amplifier stages, each amplifier stage having at least a control grid and a cathode, a circuit comprising an impedance between the cathode of each second stage and a common reference potential, the control grid and cathode of the first stage of each amplifier being coupled, respectively, across a source of signals, a circuit including a diode rectifier connected between the control grid of each first stage and a point on the impedance other than at ground potential of respective last stage to provide a common current path for at least a portion of the diode rectifier and cathode circuits, and a connection in the cathode circuit of the last stage of the first and second amplifiers to provide an output signal therebetween.

2. A D.-C. amplifier as defined in claim 1 in which the diode rectifier in each of the first and the second amplifiers is an electron tube type rectifier, the two diode rectifiers being contained in a common envelope.

3. A D.-C. amplifier as defined in claim 2 comprising, means for adjusting the gain of the last stage of each of the first and the second amplifiers.

4. A D.-C. amplifier as defined in claim 2 in which the source of signals of one amplifier stage is a reference signal.

References Cited in the file of this patent

UNITED STATES PATENTS

| | | |
|---|---|---|
| 2,647,214 | Penney et al. | July 28, 1953 |
| 2,719,191 | Hermes | Sept. 27, 1955 |